United States Patent
Kawazu et al.

(10) Patent No.: US 7,333,315 B2
(45) Date of Patent: Feb. 19, 2008

(54) SECONDARY BATTERY DEVICES

(75) Inventors: Masami Kawazu, Kanuma (JP); Hisaya Tamura, Kanuma (JP); Yuji Furuuchi, Kanuma (JP); Masahiro Matsuyoshi, Kanuma (JP); Kazutaka Furuta, Kanuma (JP)

(73) Assignees: Sony Chemical & Information Device Corporation, Tokyo (JP); Sony Corporation, Tokyo (JP)

( * ) Notice: Subject to any disclaimer, the term of this patent is extended or adjusted under 35 U.S.C. 154(b) by 175 days.

(21) Appl. No.: 11/139,599

(22) Filed: May 31, 2005

(65) Prior Publication Data

US 2005/0221164 A1 Oct. 6, 2005

Related U.S. Application Data

(63) Continuation of application No. PCT/JP03/15526, filed on Dec. 4, 2003.

(30) Foreign Application Priority Data

Dec. 12, 2002 (JP) ............................. 2002-360753

(51) Int. Cl.
*H02H 5/04* (2006.01)
(52) U.S. Cl. .................................................. 361/104
(58) Field of Classification Search ................ 361/104
See application file for complete search history.

(56) References Cited

U.S. PATENT DOCUMENTS

| 6,172,482 | B1 | 1/2001 | Eguchi |
| 6,351,361 | B1 | 2/2002 | Kawazu et al. |
| 6,420,852 | B1 | 7/2002 | Sato |
| 6,456,186 | B1* | 9/2002 | Oglesbee ............... 337/161 |
| 2002/0014945 | A1 | 2/2002 | Furuuchi et al. |
| 2002/0180453 | A1* | 12/2002 | Itoh ........................ 324/525 |

FOREIGN PATENT DOCUMENTS

| EP | 0 982 826 A2 | 3/2000 |
| EP | 0 982 830 A2 | 3/2000 |
| EP | 1 047 092 A2 | 10/2000 |
| EP | 1 156 527 A2 | 11/2001 |
| JP | A 2000-340267 | 12/2000 |

* cited by examiner

*Primary Examiner*—Michael Sherry
*Assistant Examiner*—Scott Bauer
(74) *Attorney, Agent, or Firm*—Oliff & Berridge, PLC

(57) ABSTRACT

A secondary battery device 1 including multiple protective circuits $U_1$-$U_3$ connected in parallel and each having two fuses $f_a$, $f_b$ connected in series, wherein a terminal $t_c$ of each heater h is connected to a switch element 4 via rectifier element $D_1$-$D_3$. Even if a potential difference is generated between terminals $t_c$, no residual current flows because any one of the rectifier elements $D_1$-$D_3$ is reverse-biased.

8 Claims, 13 Drawing Sheets

SECONDARY BATTERY DEVICES

CROSS-REFERENCE

This is a continuation application of PCT/JP03/15526, filed Dec. 4, 2003, which is incorporated herein in its entirety by reference.

FIELD OF THE INVENTION

The present invention relates to the field of rechargeable/dischargeable secondary batteries, particularly to secondary batteries having a built-in protective circuit.

BACKGROUND OF THE INVENTION

Secondary batteries having a built-in protective circuit have been conventionally used for portable phones or portable personal computers. Thus, there are demands for safer protective circuits with increased charging capacity.

Reference 100 in FIG. 9 represents a battery device of the prior art comprising a chargeable/dischargeable accumulator 105, a switch element 104 and a control circuit 106.

The secondary battery device 100 further comprises a first and a second connection terminals 111, 112 between which can be connected an external circuit 110 consisting of a load or DC voltage source.

When the accumulator 105 has not been charged and an external circuit 110 consisting of a DC voltage source is connected between the first and second output terminals 111, 112, the accumulator 105 becomes charged by the external circuit 110.

Conversely, when the accumulator 105 has been charged and an external circuit 110 consisting of a load such as a portable computer is connected between the first and second output terminals 111, 112, a power is supplied to the external circuit 110 from the accumulator 105 because the first output terminal 111 supplies a positive voltage with respect to the second output terminal 112 that is at ground potential.

Reference U in FIG. 9 represents a protective circuit. This protective circuit U comprises a heater h and two fuses $f_a$, $f_b$ as shown in FIG. 10.

The two fuses $f_a$, $f_b$ are connected in series. The first output terminal 111 and the positive terminal of the accumulator 105 are connected to each other via the series circuit.

The heater h consists of a parallel circuit of two resistance heating elements $r_a$, $r_b$. One end of the heater h is connected to a junction P at which the two fuses $f_a$, $f_b$ are connected to each other while the other end of the heater h is connected to the second output terminal 112 (and the negative terminal of the accumulator 105) via the switch element 104.

References $t_a$, $t_b$, $t_c$ in FIG. 10 represent terminals of the protective circuit U, among which references $t_a$, $t_b$ represent both ends of the series circuit of the fuses $f_a$, $f_b$ and correspond to a terminal connected to the positive terminal of the accumulator 105 and a terminal connected to the first output terminal 111, respectively.

Reference $t_c$ represents an end of the heater h and corresponds to a terminal connected to the switch element 104.

The switch element 104 is controlled by the control circuit 106. When a DC voltage source having an overrated output voltage is connected as the external circuit 110 between the first and second output terminals 111, 112, the control circuit 106 detects overvoltage between the first and second output terminals 111, 112 and turns on the switch element 104 so that the junction P is connected to the second output terminal 112 and the negative terminal of accumulator 105 via the heater h. As a result, a current supplied from the accumulator 105 and a current supplied from the external circuit 110 flow through the fuses $f_a$, $f_b$, respectively.

Both currents flow through the resistance heating elements $r_a$, $r_b$ in the heater h, whereby they heat up.

The resistance heating elements $r_a$, $r_b$ are located near the fuses $f_a$, $f_b$, respectively, and the fuses $f_a$, $f_b$ are blown by the heat from the resistance heating elements $r_a$, $r_b$. The result is that both the current flowing from the external circuit 110 and the current discharged from the accumulator 105 are stopped.

If a short circuit occurs between the first and second output terminals 111, 112, however, the control circuit 106 does not operate and the switch element 104 remains off while the accumulator 105 becomes short-circuited at both ends and a short-circuit current is discharged from the accumulator 105.

The short-circuit current is very large because of the absence of resistance elements such as resistance heating elements $r_a$, $r_b$ in the path through which the short-circuit current flows.

When the short-circuit current flows through the fuses $f_a$, $f_b$, at least one of them is blown by self-heating.

When one of the two fuses $f_a$, $f_b$ connected in series is blown, the positive terminal of the accumulator 105 and the first output terminal 111 are disconnected and the short-circuit current stops.

The fuses $f_a$, $f_b$ as described above must be blown by self-heating when a short-circuit current flows due to a short circuit between the first and second output terminals 111, 112, but they must not be blown when a normal load 110 is connected and a rated current flows.

However, there is a need to connect protective circuits U as described above in parallel to suit a wide range of rated currents is desirable.

Reference 101 in FIG. 11 represents a secondary battery device of a related art for the present invention, comprising multiple, for example, three protective circuits $U_1$-$U_3$ connected in parallel.

When a short circuit occurs between the first and second output terminals 111, 112 and a short-circuit current flows through the fuses $f_a$, $f_b$ connected in series in each protective circuit $U_1$-$U_3$ in this layout, at least one of the fuses is blown.

However, it is unpredictable which of the two fuses $f_a$, $f_b$ is blown, i.e., it cannot be determined whether the fuse $f_a$ on the side of the accumulator 105 or the fuse $f_b$ on the side of the first and second output terminals 111, 112 is blown.

FIG. 12 shows the fuses $f_a$ on the side of the accumulator 105 were blown in all the protective circuits $U_1$-$U_3$, and FIG. 13 shows the fuses $f_b$ on the side of the output terminal 111 were blown in all the protective circuits $U_1$-$U_3$.

If the fuses $f_a$ on the side of the accumulator 105 were blown in all the protective circuits $U_1$-$U_3$, as shown in FIG. 12, the positive output terminal of the accumulator 105 become completely disconnected so that the accumulator 105 stops discharging and the short-circuit current stops.

If the fuses $f_b$ on the side of the output terminal 111 were blown in all the protective circuits $U_1$-$U_3$, as shown in FIG. 13, the output terminal 111 is disconnected from all the protective circuits $U_1$-$U_3$ while the positive output terminal of the accumulator 105 is connected to only the switch element 104. In this case, the accumulator 105 stops discharging because the switch element 104 is not turned on.

As described above, the short-circuit current stops when all the counterparts of pairs of fuses $f_a$, $f_b$ on either one side were blown in all the protective circuits $U_1$-$U_3$. However, if the fuse $f_b$ on the side of the output terminal 111 is blown in a protective circuit $U_1$ and the fuse $f_a$ on the side of the accumulator 105 is blown in another protective circuit $U_2$ as shown in FIG. 14, a residual current $I_{101}$ continues to flow because the positive terminal of the accumulator 105 is connected to the output terminal 111 via the remaining fuse $f_a$ on the side of the accumulator 105, the remaining fuse $f_b$ on the side of the output terminal 111 and two heaters h.

This residual current $I_{101}$ does not stop until the accumulator 105 completes discharging because this residual current $I_{101}$ is a small current limited by the resistance values of two heaters h so that each heater h does not heat up enough to blow the remaining fuses $f_a$, $f_b$. Furthermore, the fuses $f_a$, $f_b$ themselves do not heat up enough to be blown.

Table 1 below shows that the residual currents vary depending upon which of the two fuses, $f_a$ or $f_b$, is broken. The residual current is zero when the fuses on the same side were broken, but in other cases, large residual currents of about 0.3 A flow.

TABLE 1

Measurement results

| No | Fuse resistance (mΩ) | Heater resistance (Ω) | Blown fuses *1 $f_a$ | Blown fuses *1 $f_b$ | Blowing time (ms) | After fuse blowing Residual current(A) *2 | After fuse blowing Resistance value between $t_a$ and $t_b$ (Ω) |
|---|---|---|---|---|---|---|---|
| 1 | 5.6 | 24.1 | ○ | X | 350 | 0.00 | More than 1200 M (unmeasurable) |
|   | 5.6 | 21.2 | ○ | X |   |   |   |
|   | 5.0 | 21.6 | ○ | X |   |   |   |
| 2 | 5.4 | 22.9 | X | ○ | 360 | 0.29 | 33.3 |
|   | 5.1 | 22.2 | ○ | X |   |   |   |
|   | 5.6 | 21.1 | X | ○ |   |   |   |
| 3 | 5.7 | 22.6 | X | ○ | 310 | 0.30 | 32.4 |
|   | 5.6 | 22.9 | X | ○ |   |   |   |
|   | 5.2 | 21.0 | ○ | X |   |   |   |

*1: X ... Blown    ○ ... Not blown
*2: Current flowing between the output terminals after fuse blowing.

The various embodiments of the present invention were made to overcome the above disadvantages of the prior art with the purpose of providing a secondary battery device showing a small residual current after protective circuits have operated.

SUMMARY OF THE INVENTION

To solve the problems described above, one embodiment of the present invention provides a secondary battery device comprising an accumulator, multiple protective circuits, and a first and a second output terminals, in which device:

each of the protective circuits includes two fuses connected in series to form a series circuit, the series circuits of the two fuses are connected to each other in parallel, and when an external circuit is connected to the first and second output terminals, a discharging current supplied from the accumulator to the external circuit and a charging current supplied from the external circuit to the accumulator flow through the two fuses of each of the series circuits;

wherein each of the protective circuits includes a heater one end of which is connected to a junction between the two fuses, one end of a rectifier element is connected to the other end of each of the heaters, the other end of each of the rectifier elements is connected to a switch element, and when the switch element is turned on, a current flows through the heater of each of the protective circuits via the switch element and each of the rectifier elements.

Another embodiment of the present invention provides a secondary battery device comprising an accumulator, multiple protective circuits, and a first and a second output terminals, in which device:

each of the protective circuits includes two fuses connected in series to form a series circuit, the series circuits of the two fuses are connected to each other in parallel, and when an external circuit is connected to the first and second output terminals, a discharging current supplied from the accumulator to the external circuit and a charging current supplied from the external circuit to the accumulator flow through the two fuses of each of the series circuits;

wherein each of the protective circuits includes a heater one end of which is connected to a junction between the two fuses, a switch element is connected to the other end of each of the heaters, and when any one of the switch elements is turned on, a current flows through the heater of the protective circuit connected to the switch element via the switch element turned on.

Yet another embodiment of the present invention provides a secondary battery device comprising an accumulator, multiple protective circuits, and a first and a second output terminals, in which device:

each of the protective circuits includes two fuses connected in series to form a series circuit, and a heater one end of which is connected to a junction between the two fuses of the series circuit, the other end of the heater of each of the protective circuits is connected to a switch element, when the switch element is turned on, a current flows through the heater in each of the protective circuits via the switch element turned on, and when an external circuit is connected to the first and second output terminals, a discharging current supplied from the accumulator to the external circuit and a charging current supplied from the external circuit to the accumulator flow through the two fuses of the series circuit in each of the multiple protective circuits;

wherein the junctions in the series circuits in the protective circuits are connected to each other.

Various embodiments of the present invention also provide the secondary battery device as defined above, wherein when a current at or higher than a predetermined level flows through the heater connected to the two fuses of one of the series circuits, the two fuses are heated thereby at least one of the two fuses is blown.

One embodiment of the present invention also provides the secondary battery device as defined above, comprising a control circuit controlling the switch element, so that when the control circuit detects abnormality, the switch element is turned on.

According to the embodiments of the present invention as defined above, at least two rectifier elements are inserted into the current path connecting terminals of heaters of protective circuits, and at least one rectifier element is reverse-biased even if a voltage difference is generated between the terminals of the heaters of two protective circuits while a short-circuit current flows and one fuse is blown. Thus, no current flows from the terminal of the heater of one protective circuit into the terminal of the heater of the other protective circuit, and therefore, no residual current is generated.

According to another embodiment of the present invention, the terminal of the heater of each protective circuit is connected to another circuit via a switch element. When fuses are blown by a short-circuit current, no current flows from the terminal of each heater to the another circuit if each switch element is kept turned off.

According to yet another embodiment of the present invention, the junctions between the fuses of the protective circuits are connected to each other, so that one or more fuses are connected in parallel to a current path including a heater unless all fuses connected in series on the side of the output terminal or the side of the accumulator are blown.

The resistance value in the fuses is very smaller than the resistance value in the heater, with the result that a short-circuit current flows to the fuses and all the fuses on the side of the output terminal or the side of the accumulator are blown, whereby no residual current flows.

Figure 1:
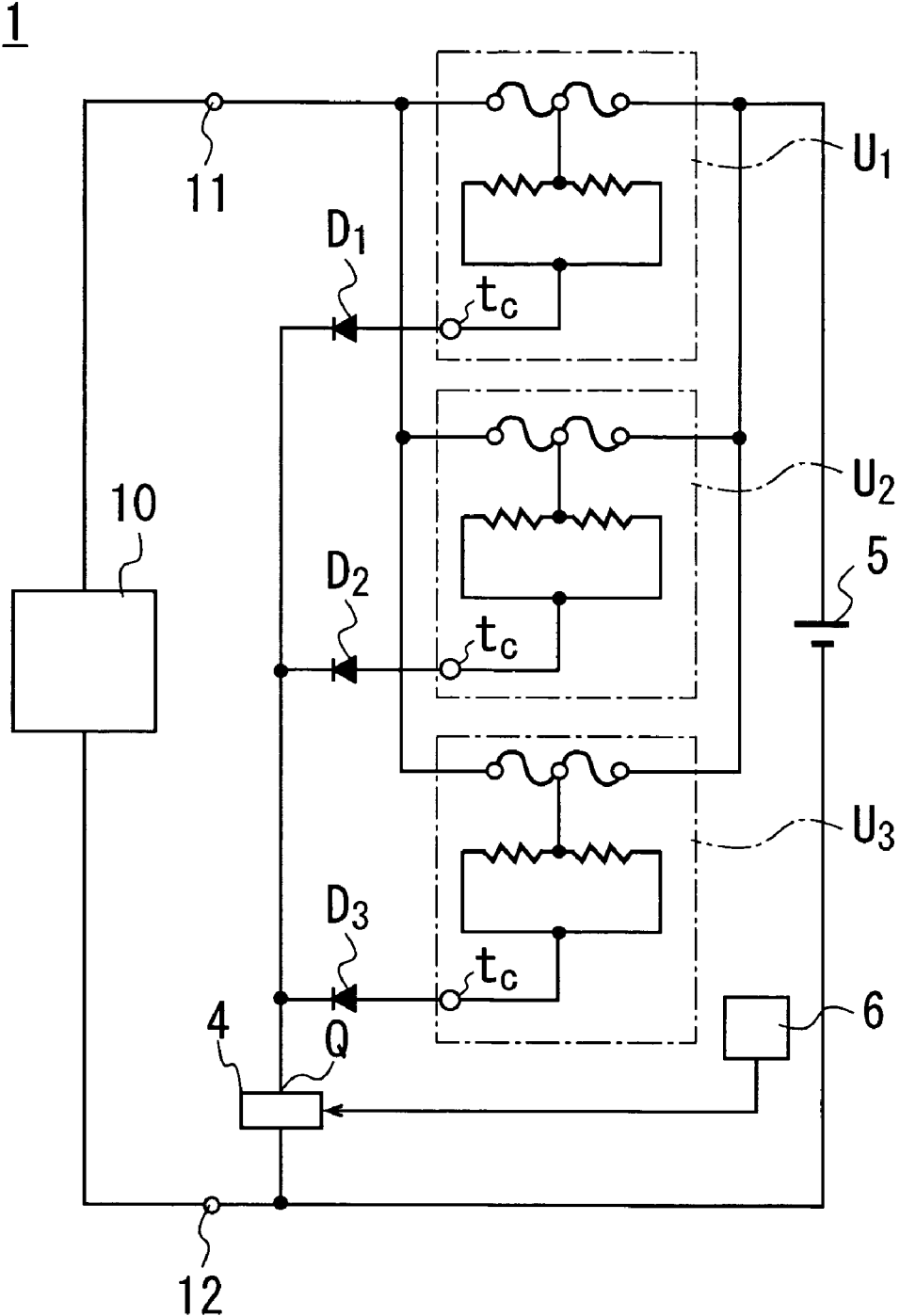
FIG. 1 shows a secondary battery device according to a first example of the present invention.

In the drawings, references 1-3 represent secondary batteries, reference 5 represents an accumulator, reference 10 represents an external circuit, reference 11 represents a first output terminal, reference 12 represents a second output terminal, references $D_1$-$D_3$ represent rectifier elements, references 4 and $Sw_1$-$Sw_3$ represent switch elements, references $U_1$-$U_3$ represent protective circuits, reference h represents a heater, references $f_a$, $f_b$ represent fuses, references $r_a$, $r_b$ represent resistance heating elements, and references $t_a$, $t_b$, $t_c$ represent terminals.

DETAILED DESCRIPTION OF THE INVENTION

FIG. 1 includes a secondary battery device 1 according to one example of the present invention.

The secondary battery device 1 according to one example comprises all the components of the secondary battery device 101 described above, i.e., it comprises a switch element 4, an accumulator 5, a control circuit 6, a first and a second output terminals 11, 12, and multiple protective circuits $U_1$-$U_3$ in the same manner as the secondary battery device 101 described above. However, the secondary battery device 1 further comprises rectifier elements $D_1$-$D_3$.

Figure 10:
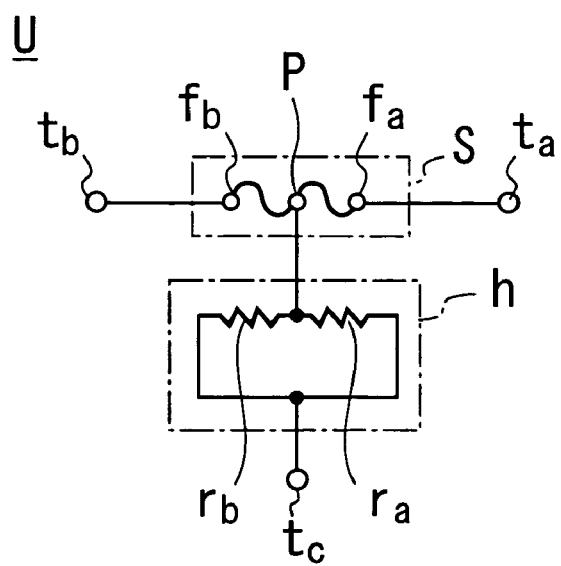
FIG. 10 is a diagram for illustrating the layout of a protective circuit.
Figure 11:
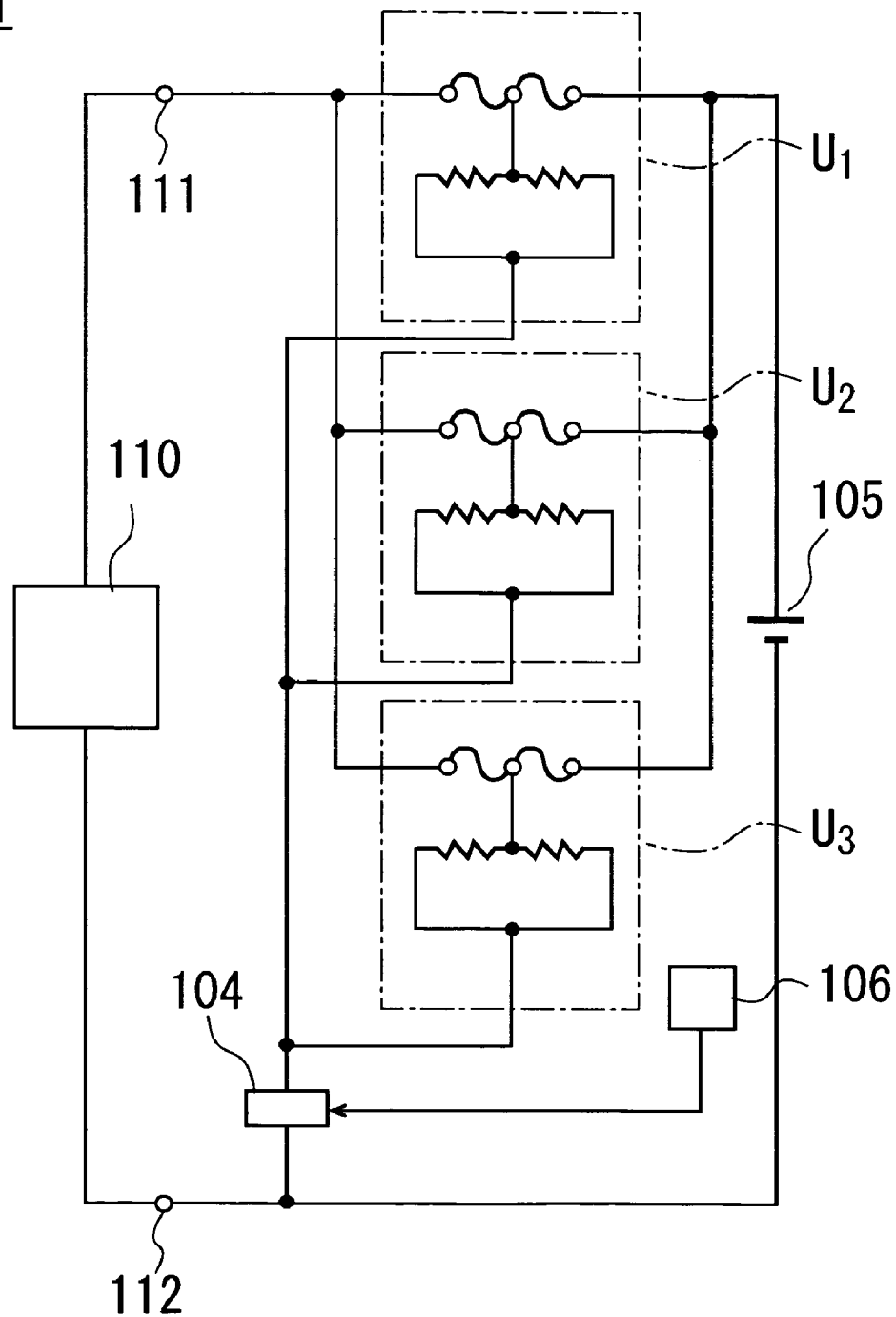
FIG. 11 shows a secondary battery device in which multiple protective circuits are connected in parallel.
Figure 12:
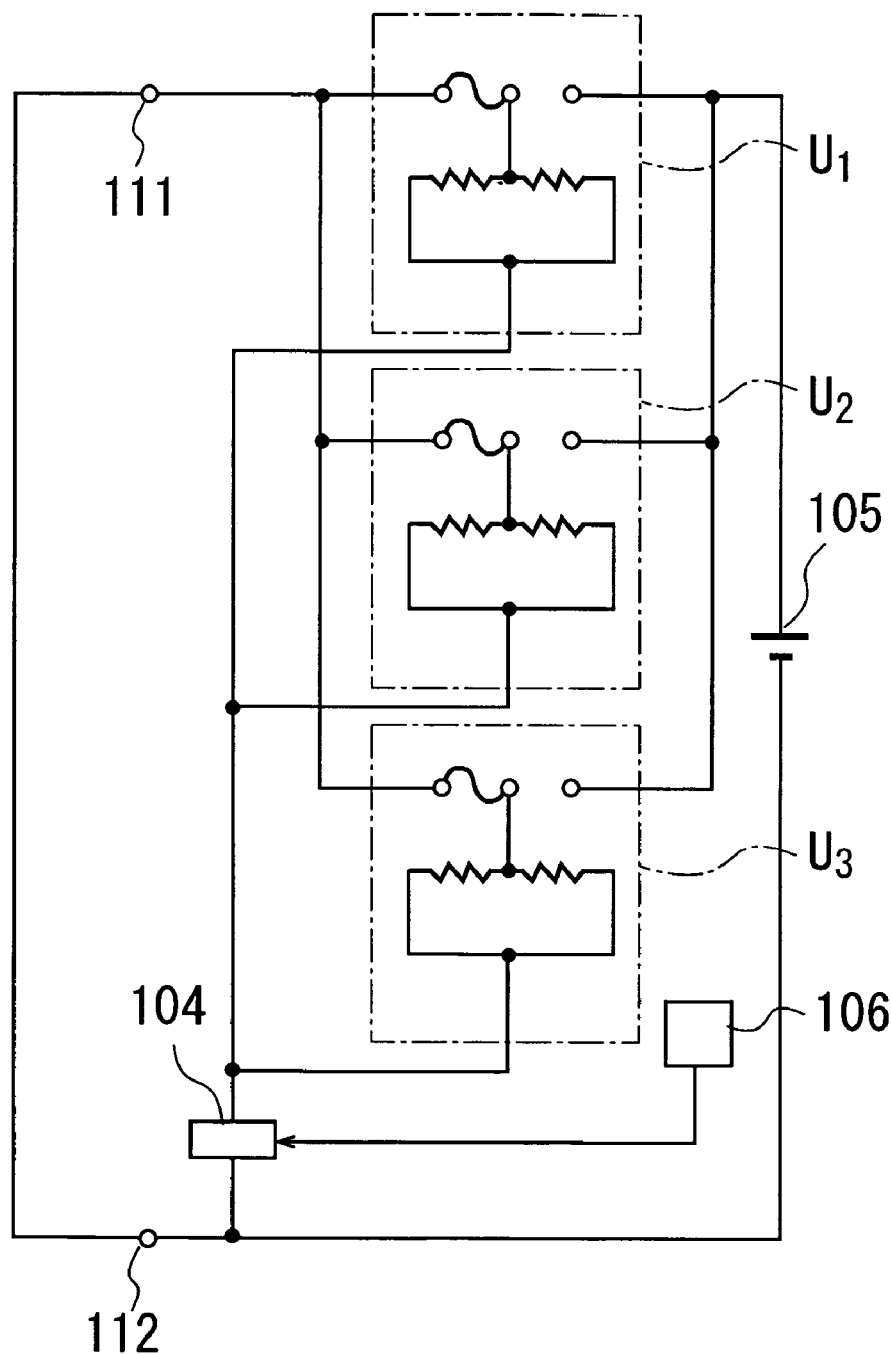
FIG. 12 shows the secondary battery device in which the fuses on the side of the accumulator have been blown.
Figure 13:
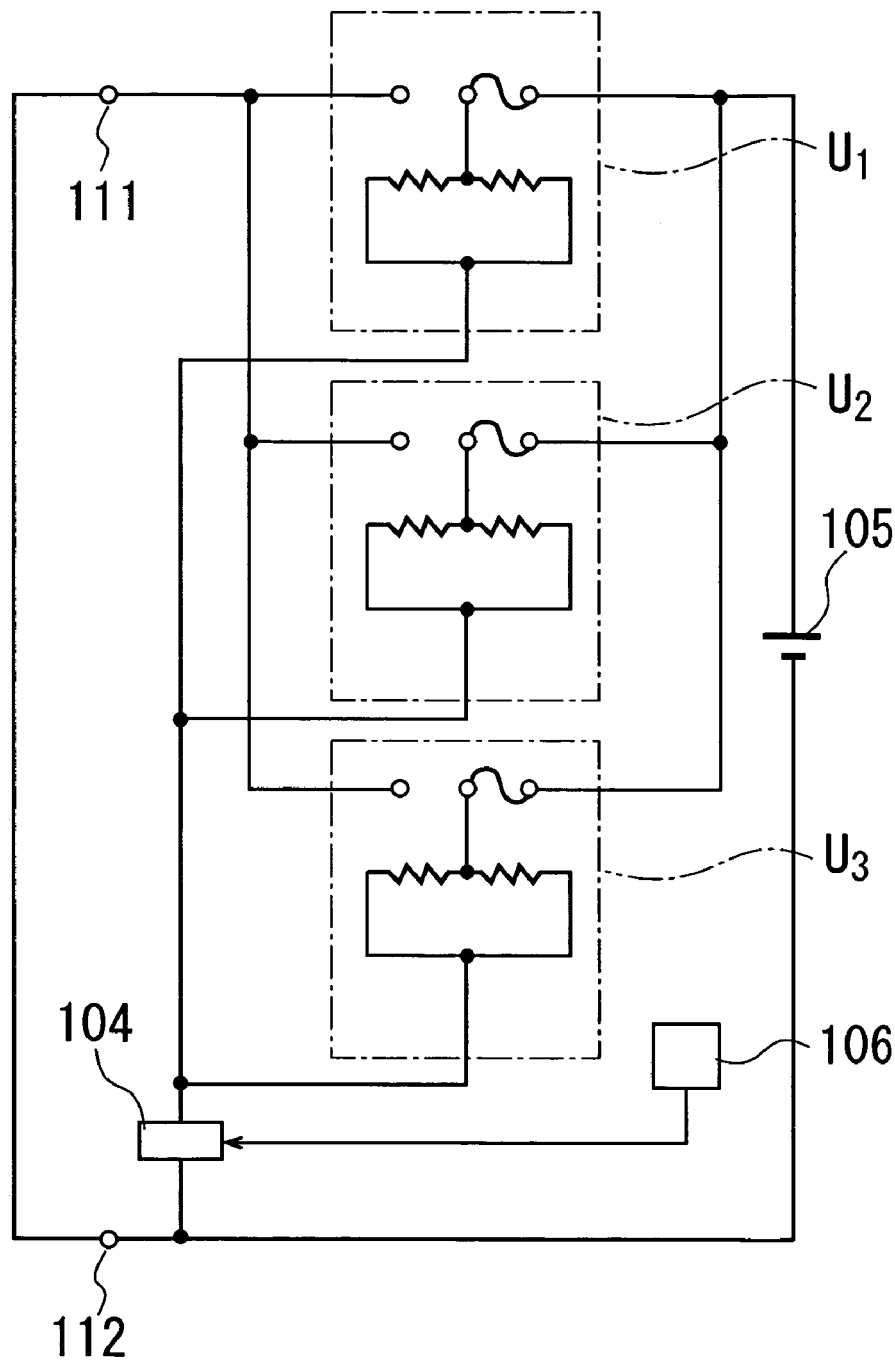
FIG. 13 shows the secondary battery device in which the fuses on the side of the output terminals have been blown.
Figure 14:
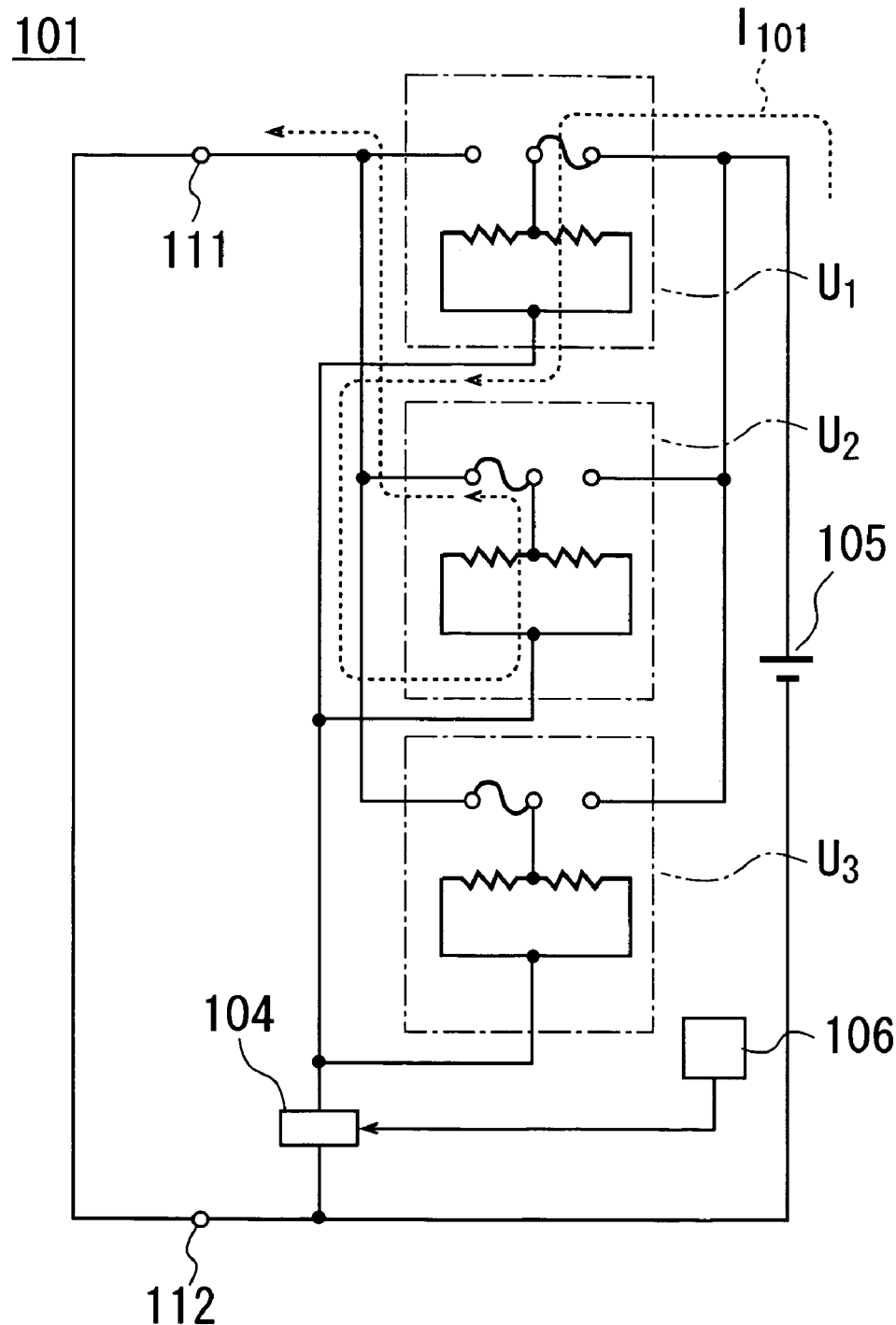
FIG. 14 is a diagram for illustrating a residual current flow when a protective circuit in which the fuse on the side of the accumulator has been blown and another protective circuit in which the fuse on the side of the output terminals has been blown exist together.

Each protective circuit $U_1$-$U_3$ has the same internal configuration as shown in FIG. 10.

Each protective circuit $U_1$-$U_3$ comprises two fuses $f_a$, $f_b$ connected in series. These two fuses $f_a$, $f_b$ are connected in series to form a series circuit S.

The positive terminal of the accumulator 5 and the first output terminal 11 are connected to each other via the series circuits S of fuses $f_a$, $f_b$ in multiple protective circuits $U_1$-$U_3$. That is, the series circuits S of two fuses $f_a$, $f_b$ are connected in parallel to each other.

The accumulator 5 is chargeable/dischargeable, so that when it has not been charged and an external circuit 10 consisting of a DC voltage source is connected between the first and second output terminals 11, 12, the accumulator 5 becomes charged with a charging current supplied from the external circuit 10. The charging current flows through the fuses $f_a$, $f_b$ in each protective circuit $U_1$-$U_3$.

In the alternative, when the accumulator 5 has already been charged and an external circuit 10 consisting of a load is connected between the first and second output terminals 11, 12, the accumulator 5 starts discharging and a discharging current is supplied to the external circuit 10. This discharging current also flows through the fuses $f_a$, $f_b$ in each protective circuit $U_1$-$U_3$.

In each protective circuit $U_1$-$U_3$ a heater h is provided, one end of which is connected to a junction P between the fuses $f_a$, $f_b$.

The anode terminal of each rectifier element $D_1$-$D_3$ is connected to the other end $t_c$ of the heater h of each protective circuit $U_1$-$U_3$. The cathode terminal of each rectifier element $D_1$-$D_3$ is connected to the second output terminal 12 and the negative terminal of the accumulator 5 via the switch element 4. In one embodiment, Schottky diodes are used as the rectifier elements $D_1$-$D_3$.

Turning-on and turning-off the switch element 4 is controlled by a control circuit 6, so that the control circuit 6 turns on the switch element 4 when it detects abnormality such as overvoltage between the first and second terminals 11, 12.

Turning-on the switch element 4 allows the junction P in each protective circuit $U_1$-$U_3$ to be connected to the second output terminal 12 and to the negative terminal of the accumulator 5, respectively, via the heater h in each protective circuit $U_1$-$U_3$ and one rectifier element $D_1$-$D_3$.

When the switch element 4 is turned on, each rectifier element $D_1$-$D_3$ is forward-biased and a current is supplied to the heater h from the external circuit 10 or accumulator 5 because a positive voltage is applied to the junction P with respect to the second output terminal 12 and the negative terminal of the accumulator 5 that is at ground potential.

The heater h consists of a parallel circuit of two resistance heating elements $r_a$, $r_b$. Of the two resistance heating elements, one resistance heating element $r_a$, is thermally coupled to one fuse $f_a$. The other resistance heating element $r_b$, is thermally coupled to the other fuse $f_b$, whereby the resistance heating elements $r_a$, $r_b$ in each protective circuit $U_1$-$U_3$ heat up under a current flowing through them and the two fuses $f_a$, $f_b$ are blown by the heat.

When a short circuit occurs between the first and second output terminals 11, 12 and a large short-circuit current supplied from the accumulator 5 flows through the fuses $f_a$, $f_b$ in each protective circuit $U_1$-$U_3$, at least one of the two fuses $f_a$, $f_b$ is blown.

In the case of the secondary battery device 1 according to the first example, the terminals $t_c$ of the heaters h in protective circuits $U_1$-$U_3$ are connected to each other via two rectifier elements, among rectifier elements $D_1$-$D_3$, opposed to each other while one rectifier element among rectifier elements $D_1$-$D_3$ is reverse-biased even if a potential difference is generated between terminals $t_c$.

Figure 2:
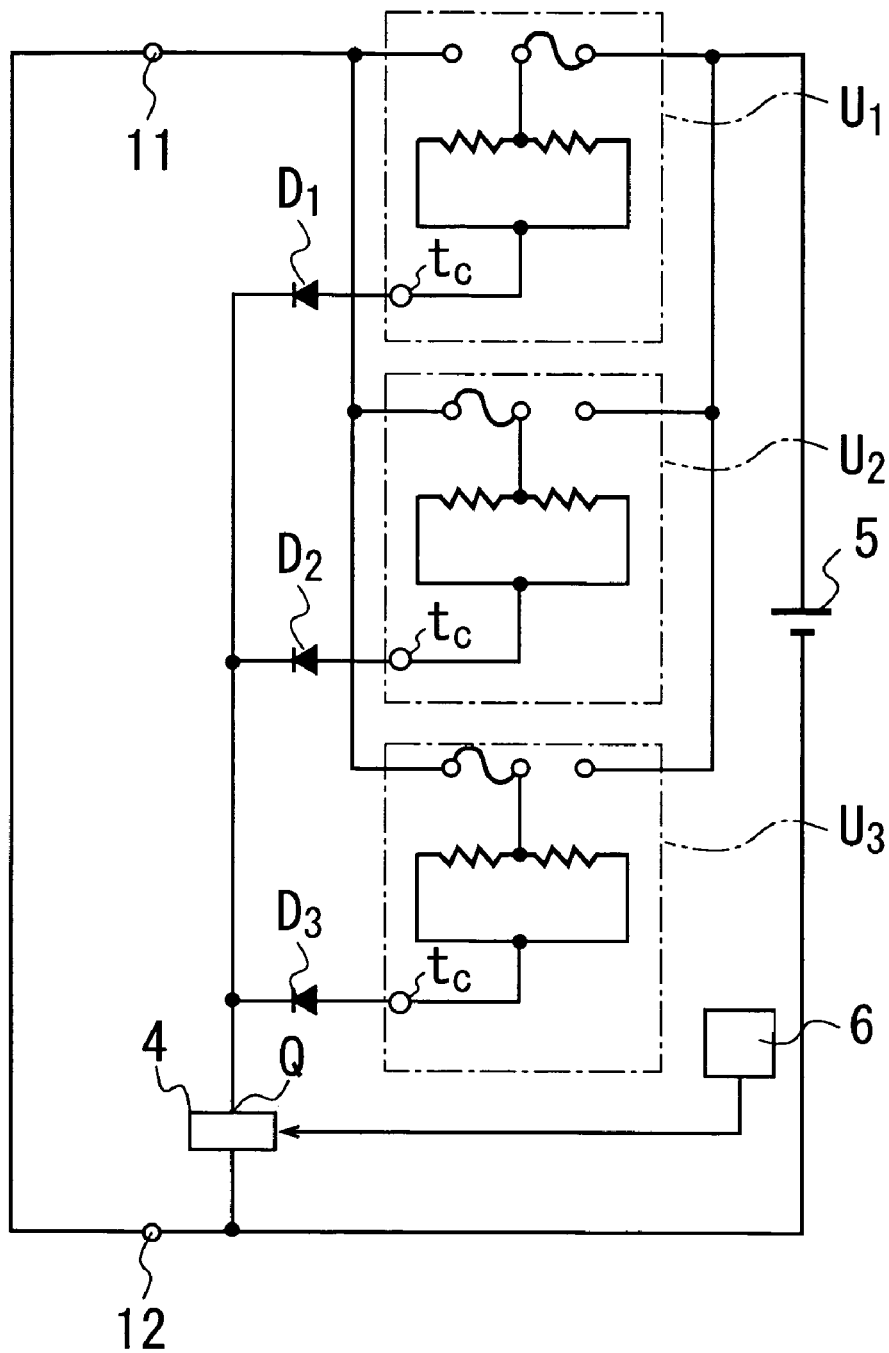
FIG. 2 is a diagram for illustrating the condition of the secondary battery device after fuse-blowing.

Thus, even if a protective circuit $U_1$ in which the fuse $f_b$ on the side of the output terminal 11 has been blown and another protective circuit $U_2$ in which the fuse $f_a$ on the side of the accumulator 5 has been blown exist together as shown in FIG. 2, no current flows through the remaining fuses $f_a$, $f_b$ because one rectifier element $D_2$ is reverse-biased. Therefore, any residual current exceeding the leakage current from the rectifier element $D_2$ does not flow between the protective circuits $U_1$, $U_2$.

Figure 3:
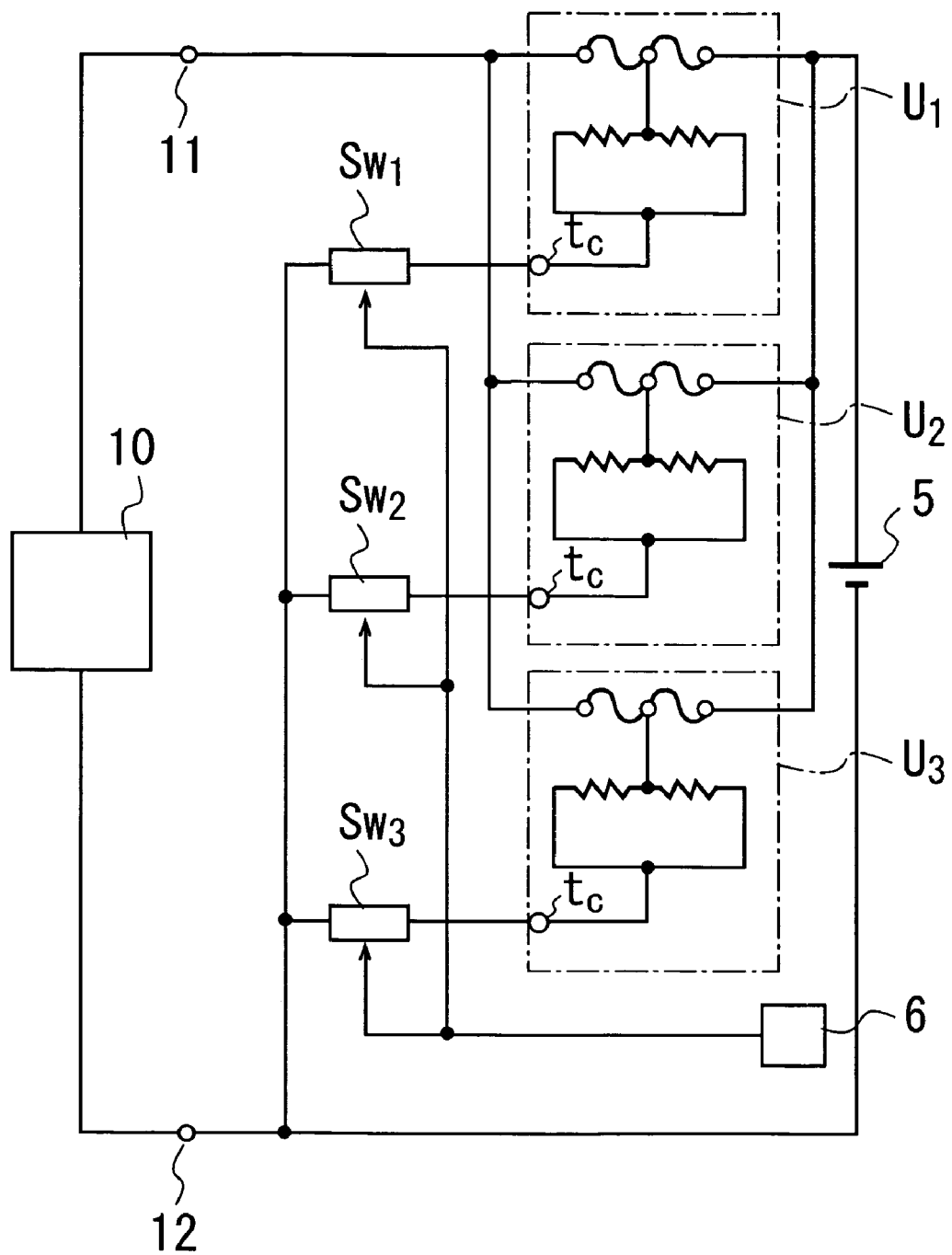
FIG. 3 shows a secondary battery device according to a second example of the present invention.

FIG. 3 shows a secondary battery device 2 according to a second example of the present invention. The rectifier elements $D_1$-$D_3$ in the secondary battery device 1 according to the first example are replaced by the same number of switch elements $Sw_1$-$Sw_3$ as the number of protective circuits $U_1$-$U_3$. Here, n-channel MOSFET devices are used as the switch elements $Sw_1$-$Sw_3$.

Each switch element $Sw_1$-$Sw_3$ is connected at one end to a terminal $t_c$ of the heater h in each protective circuit $U_1$-$U_3$. Here, the switch element 4 in the first example described above is omitted and the other end of each switch element $Sw_1$-$Sw_3$ in the second example is directly connected to the second output terminal 12 and the negative terminal of the accumulator 5. Turning-on and turning-off each switch element $Sw_1$-$Sw_3$ is controlled by a control circuit 6.

This second example is otherwise identical to the secondary battery device 1 according to the first example. When the control circuit 6 detects overvoltage between the output terminals 11, 12, it turns on all switch elements $Sw_1$-$Sw_3$ to apply a current to the heater h in all the protective circuits $U_1$-$U_3$, thereby blowing two fuses $f_a$, $f_b$.

When a short circuit occurs between the first and second output terminals 11, 12, the control circuit 6 cannot detect abnormality and each switch element $Sw_1$-$Sw_3$ remains turned off.

In the secondary battery device 2 according to the second example, the terminal $t_c$ of the heater h in each protective circuit $U_1$-$U_3$ is connected to the second output terminal 12 and the negative terminal of the accumulator 5 via switch element $Sw_1$-$Sw_3$ and not connected to any other part.

Figure 4:
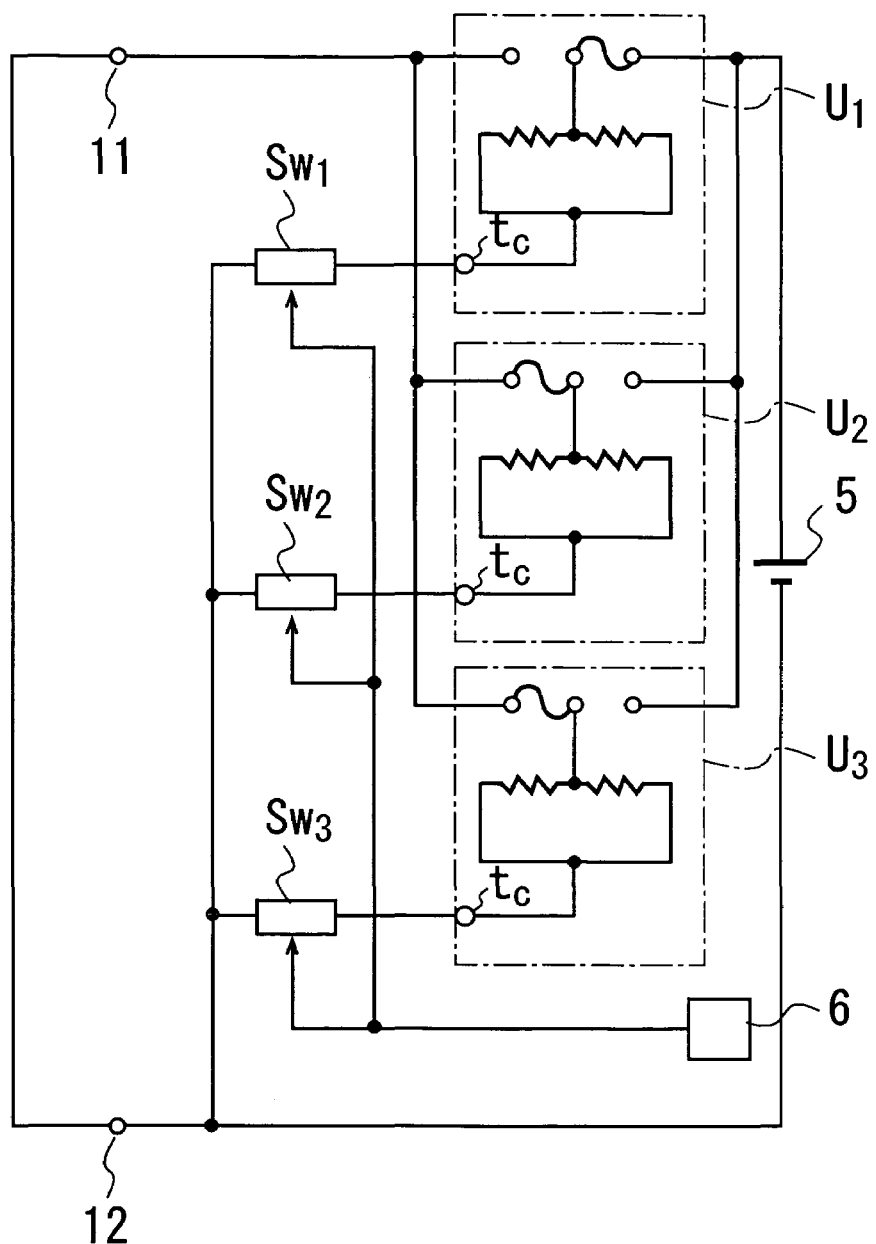
FIG. 4 is a diagram for illustrating the condition of the secondary battery device after fuse-blowing.

Thus, any current exceeding the leakage current from the switch element $Sw_1$-$Sw_3$ does not flow through the heater h so far as the switch element $Sw_1$-$Sw_3$ is turned off. Even if any one of the two fuses $f_a$, $f_b$ in each protective circuit $U_1$-$U_3$ is blown by a large short-circuit current during a short circuit so that a protective circuit $U_1$ in which the fuse $f_b$ on the side of the output terminal 11 is blown, and another protective circuit $U_2$ in which the fuse $f_a$ on the side of the accumulator 5 is blown, the fuses exist together in the secondary battery device 2, as shown in FIG. 4.

Figure 5:
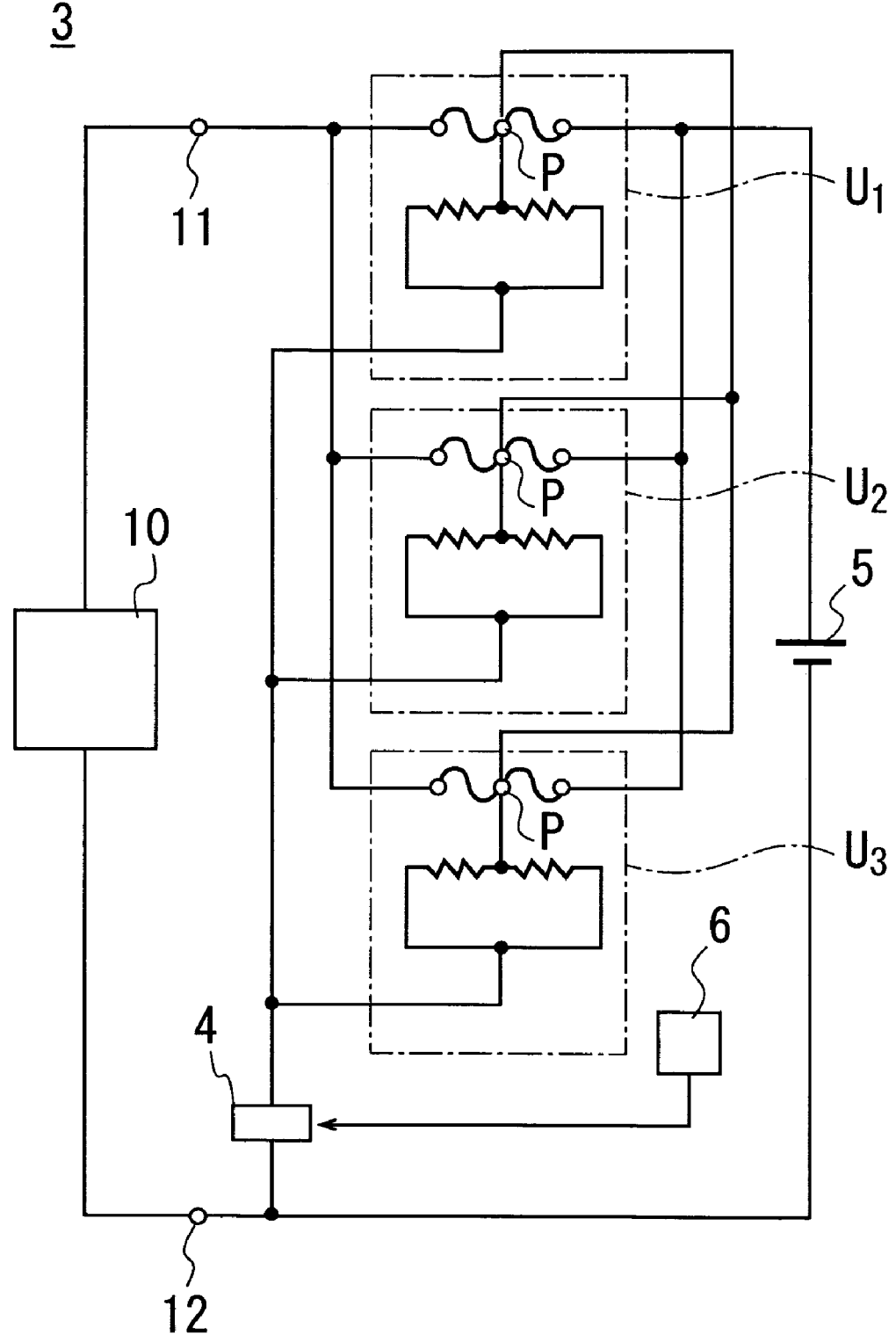
FIG. 5 shows a secondary battery device according to a third example of the present invention.

FIG. 5 shows a secondary battery device 3 according to a third example of the present invention. This secondary battery device 3 is similar to the secondary battery circuit 101 except that the junctions P in the protective circuits $U_1$-$U_3$ are connected to each other.

This secondary battery device 3 operates in the same manner as the secondary battery device 101 and the secondary battery device 1 according to the first example described above when the control circuit 6 detects overvoltage and turns on the switch element 4.

Figure 6:
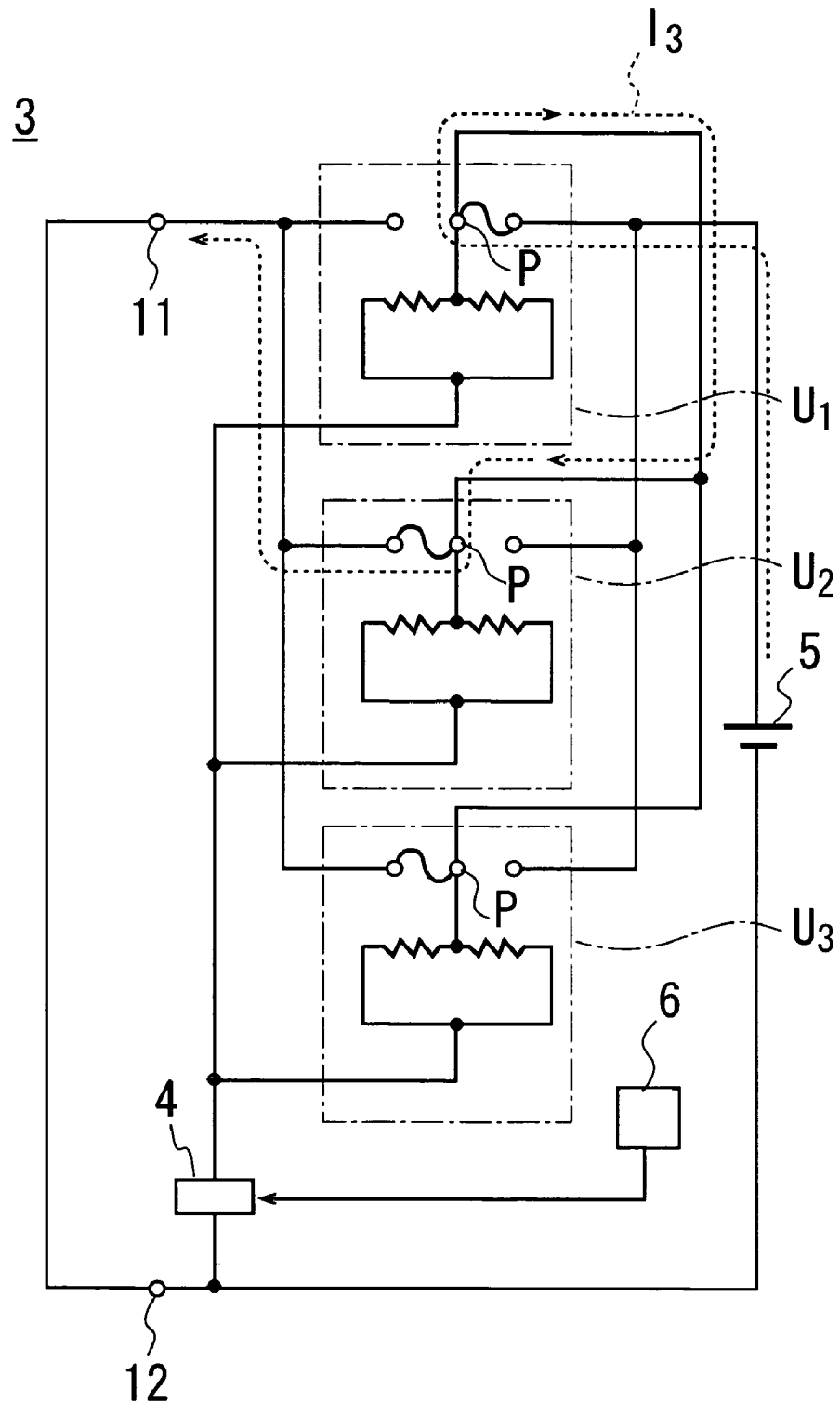
FIG. 6 is a diagram for illustrating a transient condition of the secondary battery device during fuse-blowing.

When a short circuit occurs between the first and second output terminals 11, 12 and a large short-circuit current flows through the fuses $f_a$, $f_b$ in each protective circuit $U_1$-$U_3$, any one of the fuses $f_a$, $f_b$ in each protective circuit $U_1$-$U_3$ can be broken first. This condition is shown in FIG. 6.

Again, in the secondary battery device 3 according to the third example, no more current flows when the fuses $f_a$ on the side of the accumulator 5 are blown in all the protective circuits $U_1$-$U_3$ or the fuses $f_b$ on the side of the output terminal 11 are blown in all the protective circuits $U_1$-$U_3$. However, a transient current at the same level as that of the short-circuit current continues to flow when a protective circuit $U_1$ in which the fuse $f_b$ on the side of the output terminal 11 has been blown and another protective circuit $U_2$ in which the fuse $f_a$ on the side of the accumulator 5 has been blown exist together in the secondary battery device 3.

That is, when both fuses $f_a$, $f_b$ remain, a transient current flows through the remaining fuses $f_a$, $f_b$ in different protective circuits $U_1$, $U_2$ because the positive terminal of the accumulator 5 is connected to the first output terminal 11 via the remaining fuse $f_a$ on the side of the accumulator 5 and the remaining fuse $f_b$ on the side of the first output terminal 11. Reference $I_3$ in FIG. 6 represents the transient current.

Figure 7:
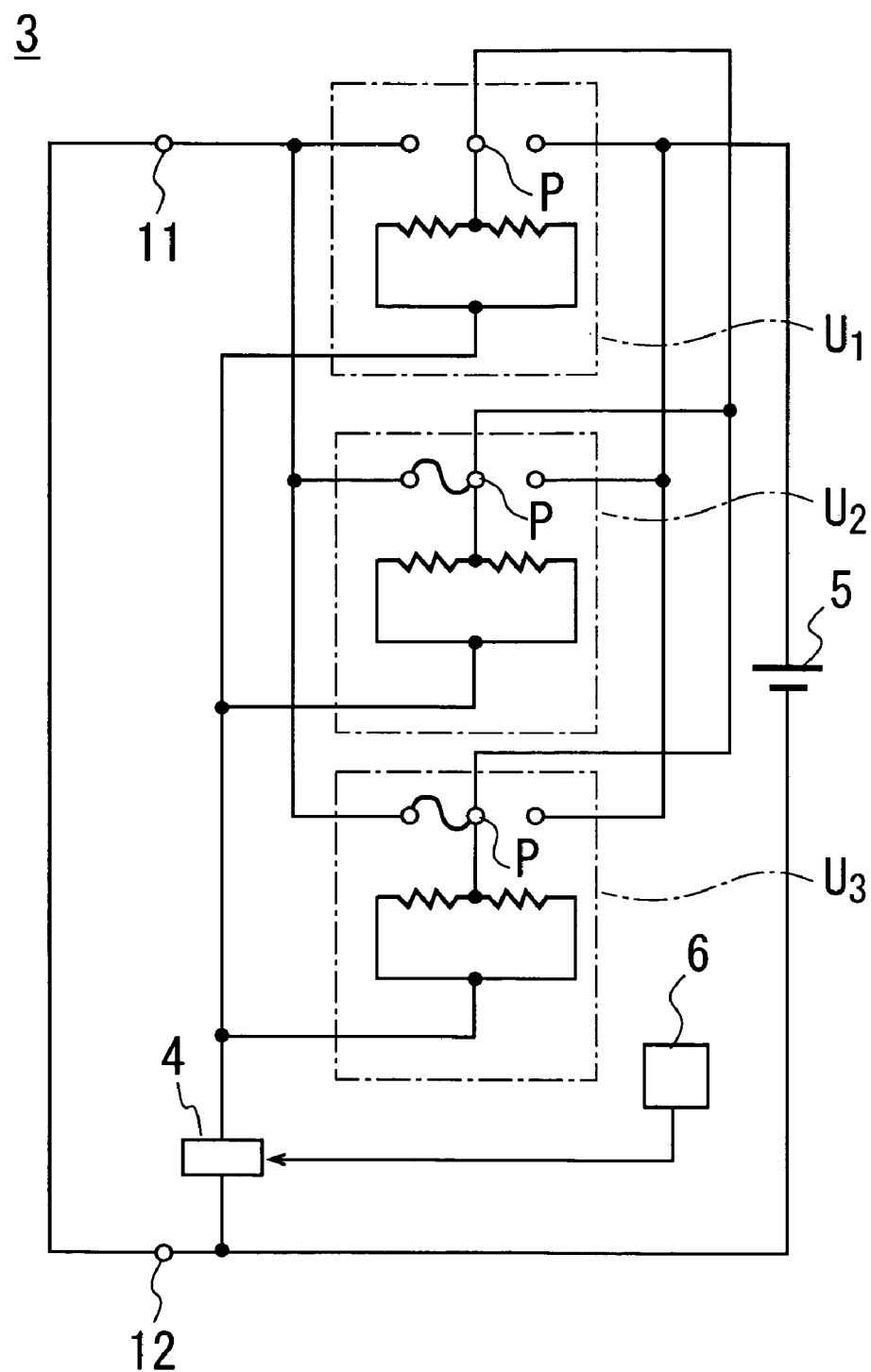
FIG. 7 is a diagram for illustrating the condition of the secondary battery device after fuse-blowing.

This transient current $I_3$ does not pass through the heater h. Thus, it is as large as the short-circuit current. Therefore, at least one counterpart of the pair of fuses $f_a$, $f_b$ through which this transient current flows are blown by self-heating. FIG. 7 shows the case in which the fuse $f_a$ on the side of the accumulator 5 were blown.

As long as the fuse $f_b$ on the side of the output terminal 11 remains in a protective circuit and the fuse $f_a$ on the side of the accumulator 5 remains in another protective circuit, the transient current $I_3$ flows. Eventually, this transient current $I_3$ blows all fuses $f_a$ on the side of the accumulator 5 or all fuses $f_b$ on the side of the output terminal 11 in protective circuits $U_1$-$U_3$, whereby the transient current $I_3$ stops flowing.

In this condition, the residual current also stops flowing in the absence of any path connecting the positive terminal of the accumulator 5 and the first output terminal 11 because all fuses $f_a$, $f_b$ on at least one side have been blown.

Figure 8A:
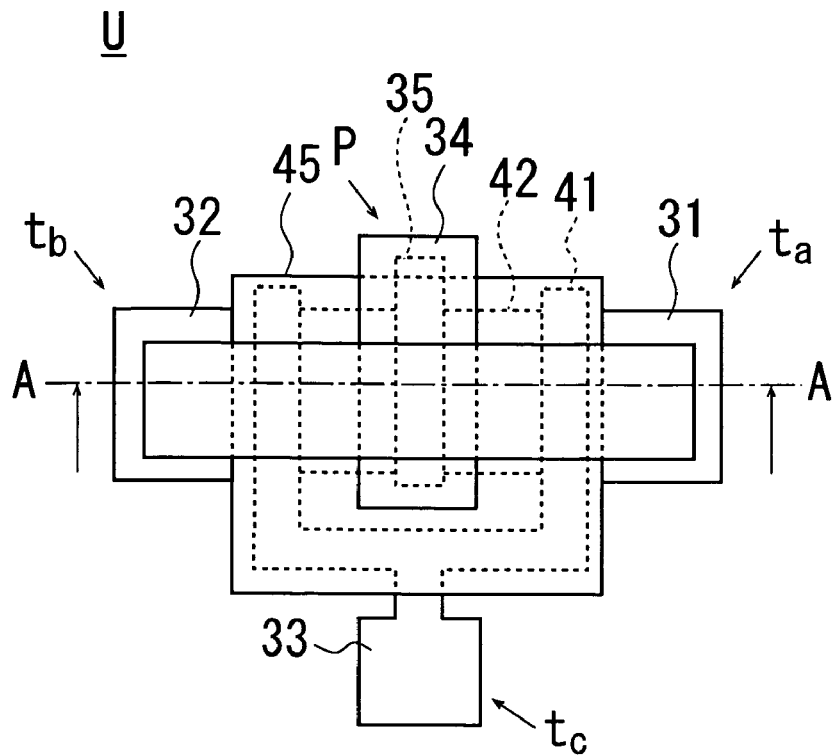
FIG. 8a is a schematic plan view of a protective circuit and FIG. 8b is a sectional view thereof.

The configuration of the protective circuit $U_1$-$U_3$ is explained below with reference to FIG. 8a and FIG. 8b for illustrating a schematic layout thereof in planar and sectional view, respectively.

References 31-35 represent electrodes formed by printing an Ag—Pd paste and baking it at about 850° C. for approximately 30 minutes to form terminals $t_a$, $t_b$, $t_c$, and a junction P, respectively.

Reference 41 represents a low-melting point metal foil (Sn:Sb=95:5, m.p. 240° C.) forming fuses $f_a$, $f_b$ on the right and left, respectively of the fuse electrode 34.

Reference 42 represents a resistor forming resistance heating elements $r_a$, $r_b$ formed by printing a resistive paste based on ruthenium oxide on the electrodes 31-34 and baking it. The resistance heating elements $r_a$, $r_b$ have a resistance value of 5Ω.

Figure 8B:
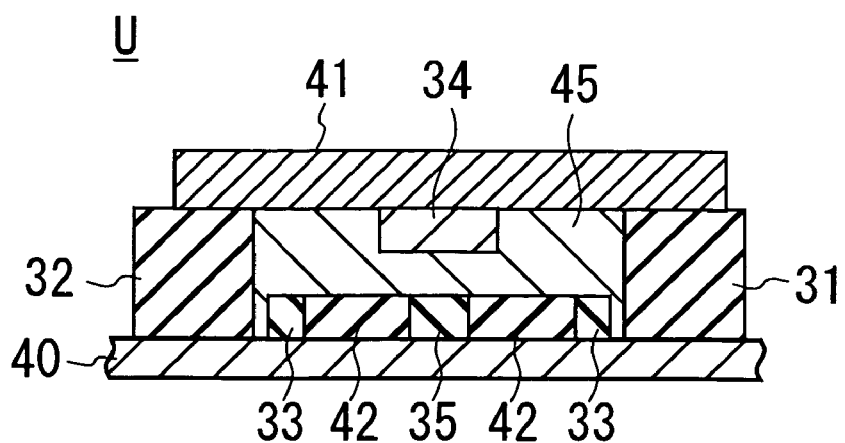
Figure 9:
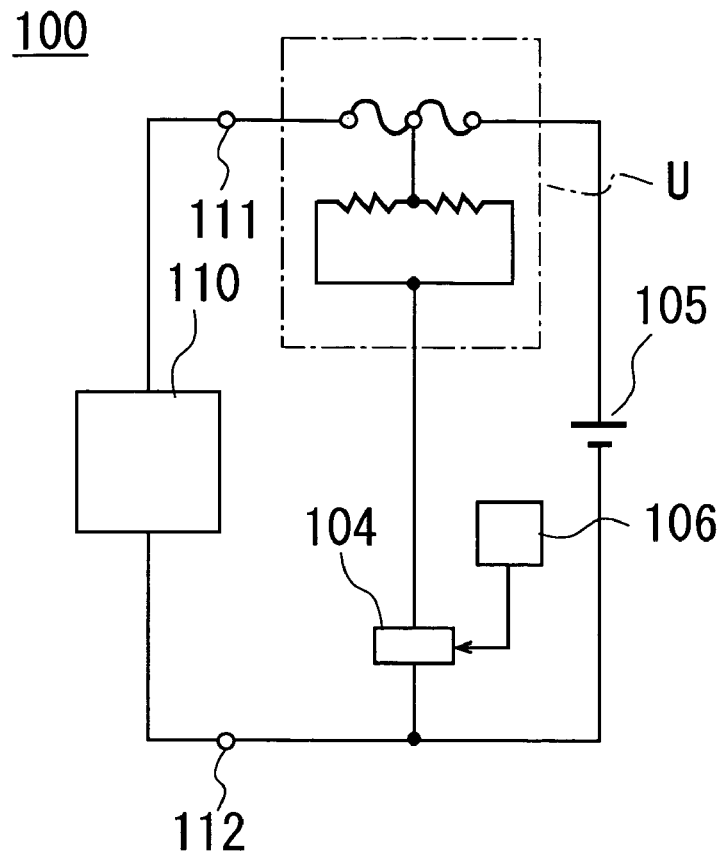
FIG. 9 is a diagram for illustrating the principle of operation of a secondary battery device.

Reference 40 in FIG. 8b represents an alumina ceramic base substrate having a thickness of 0.5 mm and dimensions of 5 mm×3 mm.

Then, a short circuit was created between the output terminals 11, 12 of the secondary battery devices 1-3 according the first to third examples embodiments described above and a current of about 100 A was passed through the series circuit S of fuses $f_a$, $f_b$ to test whether or not the protective circuits $U_1$-$U_3$ properly operate. As a comparative example, the secondary battery device 101 was also tested for the operation of the protective circuit U by creating a short circuit between the output terminals 111, 112 and passing a current of about 100 A through the series circuit S of fuses $f_a$, $f_b$.

The test results are shown in Table 2 below. For each secondary battery device 1-3 and 101, the same types of fuses $f_a$, $f_b$ and resistance heating elements $r_a$, $r_b$ were used.

In comparative example 1, a resistance component of about 33.3Ω remains and a residual current of 0.3 A flows between the terminals $t_a$, $t_b$.

In each example (first to third example), the resistance value exceeds 20 kΩ and the residual current is less than 1 mA. Especially in the third example, the highest reliability can be achieved because a fully open condition is established with no leakage current from the rectifier elements or switch elements.

The rectifier elements $D_1$-$D_3$ described above may consist of not only Schottky junction diodes but also pn-junction diodes.

The switch elements 4 and $Sw_1$-$Sw_3$ may consist of not only n-channel MOSFET devices but also other electrical or mechanical switches such as p-channel MOSFET devices, npn- or pnp-bipolar transistors and lead relays.

Accordingly, secondary battery devices can be obtained that show a small residual current after multiple protective circuits have operated.

What is claimed is:

1. A secondary battery device comprising an accumulator, multiple protective circuits, and a first and a second output terminals, in which device:
   each of the protective circuits includes two fuses connected in series to form a series circuit,
   the series circuits of the two fuses are connected to each other in parallel, and
   when an external circuit is connected to the first and second output terminals, a discharging current supplied from the accumulator to the external circuit and a charging current supplied from the external circuit to the accumulator flow through the two fuses of each of the series circuits;
   wherein each of the protective circuits includes a heater, and one end of each heater is connected to a junction between the two fuses,
   one end of a rectifier element is connected to the other end of each heater,
   the other end of each of the rectifier elements is connected to a switch element, and

TABLE 2

| | | | Operational test results | | | |
|---|---|---|---|---|---|---|
| | Fuse | Heater | Blown | | After fuse blowing | |
| | resistance | resistance | fuses*[1] | Blowing | Residual current | Resistance value |
| No | (mΩ) | (Ω) | $f_a$  $f_b$ | time (ms) | after blowing(A) *[2] | between $t_a$ and $t_b$ (Ω) |
| Comparative example | 5.5 | 21.3 | X  ○ | 330 | 0.30 | 33.3 |
| | 5.6 | 21.9 | ○  X | | | |
| | 5.5 | 20.9 | ○  X | | | |
| First example | 5.3 | 21.8 | ○  X | 320 | 0.00 | 21.02 K*[3] |
| | 5.6 | 21.8 | X  ○ | | | (18 V applied, |
| | 5.6 | 21.5 | X  ○ | | | 0.856 mA) |
| Second example | 5.2 | 23.2 | ○  X | 340 | 0.00 | 23.17 K*[3] |
| | 5.3 | 22.0 | X  ○ | | | (18 V applied, |
| | 5.6 | 21.7 | ○  x | | | 0.959 mA) |
| Third example | 5.5 | 22.1 | X  X | 400 | 0.00 | Below current threshold |
| | 5.3 | 23.0 | ○  X | | | (18 V applied, |
| | 5.5 | 21.8 | X  X | | | 0.000 mA) |

*[1]X . . . Blown   ○ . . . Not blown
*[2]Current flowing between the output terminals after fuse blowing.
*[3]The resistance between $t_a$ and $t_b$ was calculated from the measured value of the current flowing under 18 V applied across terminals $t_a$ and $t_b$.

when the switch element is turned on, a current flows through each of the rectifier elements, the heater of each of the protective circuits and the switch element which is turned on.

2. The secondary battery device according to claim 1, wherein when a current at or higher than a predetermined level flows through the heater connected to the two fuses of one of the series circuits, the two fuses are heated and thereby at least one of the two fuses is blown.

3. The secondary battery device according to claim 2, further comprising a control circuit controlling the switch element, so that when the control circuit detects an abnormality, the switch element is turned on.

4. The secondary battery device according to claim 1, further comprising a control circuit controlling the switch element, so that when the control circuit detects an abnormality, the switch element is turned on.

5. A secondary battery device comprising an accumulator, multiple protective circuits, and a first and a second output terminals, in which device:
  each of the protective circuits includes two fuses connecting one end to each other at a junction and the fuses connected in series to form a series circuit, and a heater, one end of each heater is connected to the junction,
  the other end of each heater is connected to a switch element,
  when the switch element is turned on, a current flows through the heater in each of the protective circuits via the switch element that is turned on, and
  when an external circuit is connected to the first and second output terminals, a discharging current supplied from the accumulator to the external circuit and a charging current supplied from the external circuit to the accumulator flow through the series circuit of the two fuses in each of the multiple protective circuits;
  wherein the junctions in the series circuits in the protective circuits are connected to each other.

6. The secondary battery device according to claim 5, wherein when a current at or higher than a predetermined level flows through the heater connected to the two fuses of one of the series circuits, the two fuses are heated and thereby at least one of the two fuses is blown.

7. The secondary battery device according to claim 6, further comprising a control circuit controlling the switch element, so that when the control circuit detects an abnormality, the switch element is turned on.

8. The secondary battery device according to claim 5, further comprising a control circuit controlling the switch element, so that when the control circuit detects an abnormality, the switch element is turned on.

* * * * *

UNITED STATES PATENT AND TRADEMARK OFFICE
CERTIFICATE OF CORRECTION

PATENT NO. : 7,333,315 B2 Page 1 of 1
APPLICATION NO. : 11/139599
DATED : February 19, 2008
INVENTOR(S) : Masami Kawazu et al.

It is certified that error appears in the above-identified patent and that said Letters Patent is hereby corrected as shown below:

On Title Page

Item (73) Assignees reading "Sony Chemical & Information Device Corporation, Tokyo (JP); Sony Chemical Corporation, Tokyo (JP)" should be changed to --Sony Corporation, Tokyo (JP); Sony Chemical & Information Device Corporation, Tokyo (JP)--.

Signed and Sealed this

Third Day of June, 2008

JON W. DUDAS
*Director of the United States Patent and Trademark Office*